United States Patent
Weisskopf et al.

(10) Patent No.: US 11,191,319 B2
(45) Date of Patent: Dec. 7, 2021

(54) COMPOSITE SPORTS ARTICLE

(71) Applicant: adidas AG, Herzogenaurach (DE)

(72) Inventors: Matthias Weisskopf, Ansbach (DE); Maximilian Philipp Kurtz, Wuerzburg (DE)

(73) Assignee: adidas AG, Herzogenaurach (DE)

( * ) Notice: Subject to any disclaimer, the term of this patent is extended or adjusted under 35 U.S.C. 154(b) by 55 days.

(21) Appl. No.: 16/149,989

(22) Filed: Oct. 2, 2018

(65) Prior Publication Data

US 2019/0098960 A1    Apr. 4, 2019

(30) Foreign Application Priority Data

Oct. 4, 2017  (DE) .................. 10 2017 009 242.7
Nov. 2, 2017  (DE) .................. 10 2017 010 201.5
Feb. 23, 2018 (DE) .................. 10 2018 202 805.2

(51) Int. Cl.
*A43B 13/32* (2006.01)
*A43B 9/12* (2006.01)
(Continued)

(52) U.S. Cl.
CPC .............. *A43B 13/32* (2013.01); *A43B 9/12* (2013.01); *A43B 13/026* (2013.01); *A43B 13/04* (2013.01);
(Continued)

(58) Field of Classification Search
CPC ....... A43B 13/32; A43B 13/026; A43B 13/04; A43B 13/125; A43B 23/0255; A43B 23/0205; A43B 23/0245; A43B 9/16; A43B 9/18; A43B 9/12; A43B 1/14; B32B 3/30; B32B 7/12
See application file for complete search history.

(56) References Cited

U.S. PATENT DOCUMENTS

| 294,174 | A | * | 2/1884 | Williams | ............... | A43B 7/125 |
| | | | | | | 36/14 |
| 1,206,749 | A | * | 11/1916 | Burnham | ............... | A43B 7/125 |
| | | | | | | 36/14 |

(Continued)

FOREIGN PATENT DOCUMENTS

| CN | 106263250 A | 1/2017 |
| DE | 202017101310 U1 | 5/2017 |

(Continued)

OTHER PUBLICATIONS

Translation of DE 20201710131 U1, published May 19, 2017.*

(Continued)

*Primary Examiner* — Ted Kavanaugh
(74) *Attorney, Agent, or Firm* — Sterne, Kessler, Goldstein & Fox P.L.L.C.

(57) ABSTRACT

The present invention relates to a composite sports article. The composite sports article includes: a first component and a second component which was produced by means of an additive manufacturing technique. The first component and the second component are bonded to each other by a first bonding agent and there is a form-fitted bond between the first bonding agent and the second component and/or the first component and the second component are bonded to each other in a form-fitted manner via a first bonding agent.

15 Claims, 8 Drawing Sheets

(51) Int. Cl.
*A43B 13/02* (2006.01)
*A43B 13/04* (2006.01)
*A43B 23/02* (2006.01)
*B32B 3/30* (2006.01)
*B32B 7/12* (2006.01)
*A43B 13/12* (2006.01)
*B33Y 10/00* (2015.01)
*B33Y 80/00* (2015.01)
*A43B 1/14* (2006.01)
*A43B 7/14* (2006.01)

(52) U.S. Cl.
CPC ........ *A43B 13/125* (2013.01); *A43B 23/0205* (2013.01); *A43B 23/0245* (2013.01); *B32B 3/30* (2013.01); *B32B 7/12* (2013.01); *A43B 1/14* (2013.01); *A43B 7/1475* (2013.01); *B32B 2437/02* (2013.01); *B33Y 10/00* (2014.12); *B33Y 80/00* (2014.12)

(56) References Cited

U.S. PATENT DOCUMENTS

| | | | |
|---|---|---|---|
| 2,183,277 A | 12/1939 | Heilhecker | |
| 3,812,604 A * | 5/1974 | Sato | B29D 35/10 36/14 |
| 4,317,294 A * | 3/1982 | Goodyear | A43B 13/36 36/100 |
| 4,420,894 A * | 12/1983 | Glassman | A43B 13/28 36/107 |
| 6,442,870 B1 * | 9/2002 | Tsai | A43B 3/103 36/100 |
| 6,789,334 B2 * | 9/2004 | Wu | A43B 7/32 36/24 |
| 7,721,466 B2 * | 5/2010 | Guo | A43B 13/36 36/15 |
| 9,486,036 B1 * | 11/2016 | Douglas | A43B 9/00 |
| 2003/0046829 A1 | 3/2003 | Baechtold | |
| 2008/0052956 A1 * | 3/2008 | Polegato Moretti | A43B 7/125 36/3 A |
| 2009/0085257 A1 | 4/2009 | Yang et al. | |
| 2010/0095557 A1 * | 4/2010 | Jarvis | A43B 1/0027 36/114 |
| 2014/0012406 A1 | 1/2014 | Cioffi et al. | |
| 2014/0059886 A1 * | 3/2014 | Lyttle | A41D 31/185 36/55 |
| 2015/0246496 A1 | 9/2015 | Jones et al. | |
| 2015/0290877 A1 * | 10/2015 | Darland | C09J 175/04 428/195.1 |
| 2015/0366289 A1 * | 12/2015 | Rustam | A43B 5/001 36/127 |
| 2016/0302508 A1 | 10/2016 | Kormann et al. | |
| 2016/0324261 A1 | 11/2016 | Guyan | |
| 2017/0181496 A1 * | 6/2017 | Guyan | A43B 7/32 |
| 2018/0169960 A1 * | 6/2018 | Seefried | B29C 65/1496 |
| 2018/0235316 A1 * | 8/2018 | Gonzalez de los Santo | C09J 5/06 |

FOREIGN PATENT DOCUMENTS

| | | |
|---|---|---|
| EP | 1346816 A2 | 9/2003 |
| EP | 2085210 A2 | 8/2009 |
| EP | 3 165 109 A1 | 5/2017 |
| JP | U 1972-028136 | 11/1972 |
| JP | H09103303 A | 4/1997 |
| JP | 2002-000305 A | 1/2002 |
| JP | 2012-525211 A | 10/2012 |
| JP | 2017-000727 A | 1/2017 |
| WO | WO 2010/126707 A1 | 11/2010 |
| WO | 2016125594 A1 | 8/2016 |

OTHER PUBLICATIONS

Translation of EP 2085210 A2, published Aug. 5, 2009.*
Translation of WO 2016/125594, published Aug. 11, 2016.*
Extended European Search Report issued in corresponding European Patent Application 18198268.7, dated Feb. 25, 2019, 9 pages.

* cited by examiner

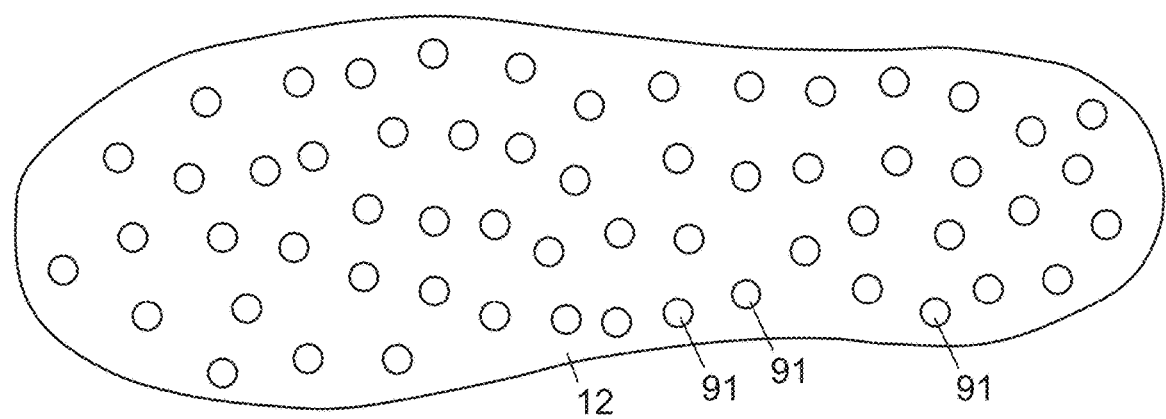
Fig. 11
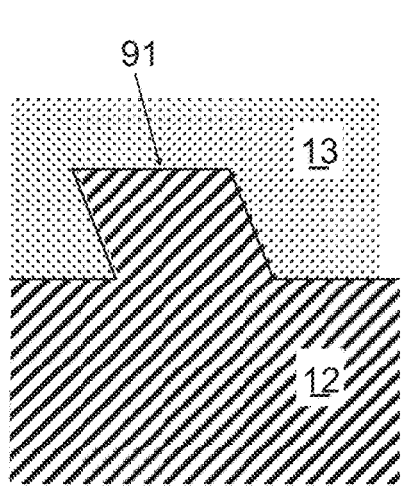 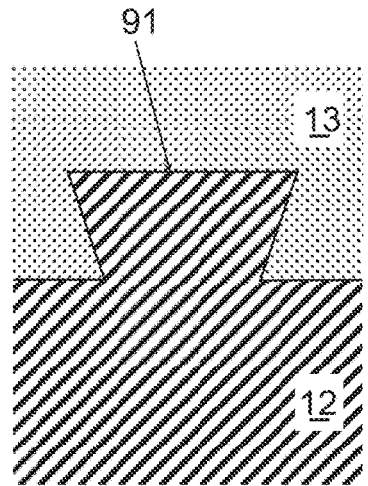
Fig. 12  Fig. 13

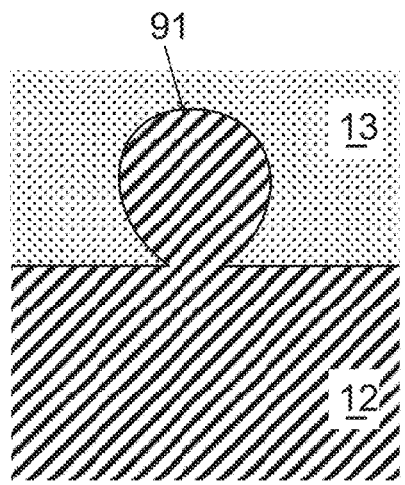
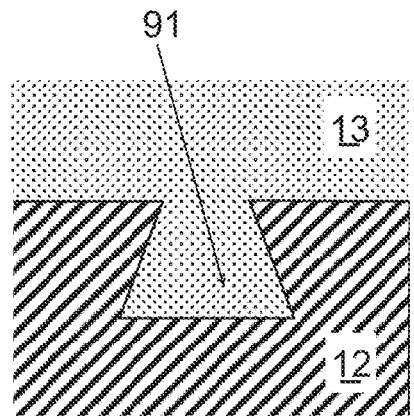
Fig. 14     Fig. 15
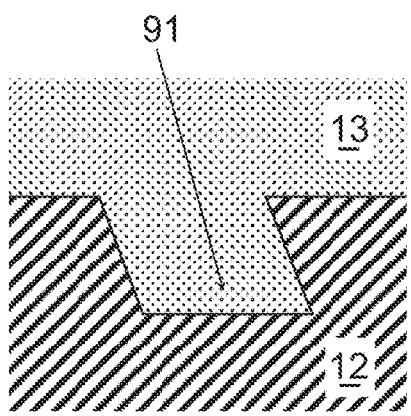
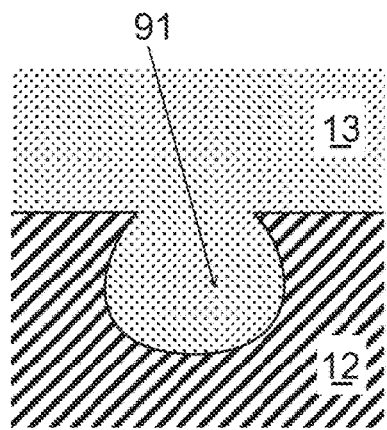
Fig. 16     Fig. 17

COMPOSITE SPORTS ARTICLE

TECHNICAL FIELD

The present invention relates to an improved method for bonding components, for a composite sports article, that cannot be easily bonded adhesively.

PRIOR ART

Additive manufacturing techniques, commonly also referred to as 3D printing, used to be limited to so-called "rapid prototyping". This is mainly due to the fact that the speed of production and the materials available for additive manufacturing techniques used to limit their application to the production of prototypes rather than finished products. Owing to advances in additive manufacturing techniques, particularly as regards the speed of production, such techniques are now starting to become mature enough for use in a production environment.

Sports articles such as apparel, footwear, or accessories such as gloves, shin guards, etc. are subject to high demands regarding material properties. For example, a shoe needs to provide a high level of protection and support for a foot in some areas yet be flexible and provide cushioning in other areas. Moreover, the human anatomy varies significantly from one athlete to another. Traditional manufacturing techniques, such as injection molding, do not allow for customization that goes beyond predetermined sizes, such as for example large (L), medium (M), or small (S) for apparel or sizes 46, 47, or 48 for shoes in the European system.

Additive manufacturing techniques allow for a level of customization that would be neither technically nor economically feasible using existing manufacturing methods. Thus, additive manufacturing techniques promise an unprecedented level of customization for sports articles. For example, the shoe may be customized for an athlete not only in terms of its size and shape, but also in terms of its functionality, such as the level of cushioning, the level of support, etc.

Most sports articles are composite articles consisting of more than one component. For example, a shoe typically requires at least an upper and a sole element. The upper may be weft-knitted, warp-knitted, woven, non-woven, etc., while the sole element can be produced by means of additive manufacturing techniques.

However, an existing challenge in additive manufacturing techniques is that some of the materials suitable for additive manufacturing may have poor adhesive properties. For example, the materials suitable for additive manufacturing techniques typically comprise a plasticizer that leads to poor adhesion in combination with a wide range of bonding agents. Moreover, many materials that are suitable for additive manufacturing techniques are not thermoplastic and therefore cannot be thermally welded. Therefore, using existing methods, it is not possible to form a sports article as a composite article comprising a first component that is securely bonded to a second component, if the second component is produced by means of additive manufacturing techniques.

It is therefore an object underlying the present invention to provide a composite sports article and method for the production thereof that allows for individual customization but whose components are also securely bonded to each other in order to withstand the stresses of regular usage during physical activity.

For producing shoes individually adapted to the needs of the respective user, it is for example known from DE 10 2005 023 473 A1 to draw on methods of rapid prototyping, such as additive manufacturing methods (e.g. layer manufacturing methods), for manufacturing an upper and/or sole.

It is, in turn, known from DE 10 2015 206 900 A1 to first manufacture the upper and the sole separately and to only bond these to each other in a subsequent step of manufacturing. Such an approach has advantages regarding manufacturing engineering. However, the bond between the upper and the sole is a potential weakness of the shoe, as shearing off can occur in the area of a bonding interface between the upper and the sole. It is conceivable to improve the quality of the bond between the upper and the sole by inserting an adhesive compound consisting of a hot melt layer and a TPU (thermoplastic polyurethane) layer. However, this approach would be technically complex and would increase the number of materials required. Moreover, the TPU layer would have to be formed in a separate upstream method step.

Thus, it is a further technical object underlying the present invention to create a shoe exhibiting a high bonding strength between the upper and sole, which are first manufactured separately.

SUMMARY OF THE INVENTION

This object is achieved by the teachings of the independent claims. The invention particularly concerns a composite sports article, comprising: a first component; a second component, which was produced by means of an additive manufacturing technique; wherein the first component and the second component are bonded to each other by a first bonding agent and wherein there is a form-fitted bond between the first bonding agent and the second component; and/or wherein the first component and the second component are bonded to each other in a form-fitted manner via a first bonding agent.

The term "additive manufacturing techniques" is to be understood in the conventional manner. This means that additive manufacturing techniques refers to all techniques applying an additive shaping principle and thereby building physical 3D geometries by successive addition of material. Additive manufacturing techniques include 3D printing and techniques sometimes referred to as "rapid prototyping". In particular, additive manufacturing techniques comprise techniques such as laser sintering, direct metal laser sintering, selective laser melting, fused deposition modeling FDM®, fused filament manufacturing, and stereolithography. Any additive manufacturing technique is suitable for the present invention.

A bonding agent is any compound or composition that has any level of adhesion on the first component and/or the second component. It is to be noted that this level of adhesion may be very low. Especially on the second component, the chemical bond of the bonding agent may be very weak. In general, thermoplastic materials, in particular hot melts, thermoplastic polyurethane, a polyamide (PA) or a polyether block amide (PEBA), are suitable as bonding agents.

According to the invention, there can be a form-fitted bond between the bonding agent and the second component, meaning that the bond between the first component and the second component is only form-fitted indirectly via the bonding agent. However, it is also possible that the bond between the first component and the second component is directly form-fitted, with the bond still using a first bonding agent, for example to generate a basic adhesion to hold the first and the second component in the form-fitted bond. The composite sports article in accordance with the invention comprises a strong bond between the first component and the second component, even if the bonding agent does not adhere strongly to the second component. The bond is especially strong against lateral forces, such as shear forces.

The composite sports article may be an article of footwear, an article of apparel, or a sports accessory. The sports accessory in this context is any item used or worn during an athletic activity. A shin guard, gloves, or a sports racket are examples of sports accessories. An article of footwear, an article of apparel, or a sports accessory is subject to high forces, strains and torques during physical activity. Therefore, it is particularly important that the bond between the first component and the second component is strong.

The composite sports article may be a shoe, the first component may be a part of a shoe upper and the second component may be a part of a sole. The term "upper" in the context of the present invention refers to a "shoe upper" unless anything else follows from the context. A shoe in the present context is any type of shoe, for example a soccer boot, a hiking boot, a running shoe, or a sandal. The present invention is greatly beneficial for a shoe, which needs to be strong and durable as it is exposed to the whole weight of the athlete. For example, a weak bond between the shoe upper and the sole may increase the risk of the upper tearing off the sole during physical activity. The shoe also needs to provide the right level of support, for example around the ankle, yet it has to be flexible, for example in an instep region and provide the right level of cushioning, for example in a heel region. Thus, it is advantageous to form the shoe as a composite article. A sole at least partly formed by means of additive manufacturing techniques allows for the right level of cushioning for each part of the foot and may be individually customized for the athlete. For example, the heel region may be engineered to provide a high level of cushioning while the toe region may be engineered to be firmer than the heel region. The present invention therefore provides a composite shoe with a preferred level of fit and ideal functional properties that is at the same time durable due to the strong bond between the shoe upper and the sole.

The composite sports article may be a shoe and the first component may be a bottom side of the shoe upper and the second component may be a topside of the sole.

The shoe upper may be a textile shoe upper. For example, the shoe upper may be at least partially weft-knitted and/or partially warp-knitted. Such a shoe upper is particularly flexible and comfortable to wear. The shoe upper may also be at least partially woven or non-woven. Moreover, the shoe upper may comprise at least one reinforcement element.

The second component may comprise an activated photopolymer. Here, a photopolymer is any substance that can be activated, i.e. cured, by light, wherein activation causes a liquid photopolymer to solidify. A UV-curable resin is an example of a photopolymer. UV is an abbreviation for ultraviolet. The second component can for example comprise a mixture of UV-curable resin and polyurethane. In the cured state, this mixture yields a stiff and durable second component.

By using a photopolymer, it is possible to construct the second component by stereolithography which allows for the second component to be built with a particularly high resolution at fast production speeds.

In addition to the activation by light, the photopolymer is preferably hardened additionally, for example by heating the second component with hot air, conductive heating (heat pressing), infrared radiation, or by any other suitable method. This additional hardening may greatly increase the strength of the material, for example as measured by the Young's modulus of the material. Hardening at ambient temperature is also possible in principle, however, this would occupy more time.

The second component may comprise a lattice structure comprising a plurality of voids. The voids may be connected to one another to form one large void within a mesh-like structure, or the voids may not be connected to one another. A lattice structure is preferable for a plurality of applications as it allows for a strong, yet flexible and cushioning structure to be produced at low weight. Moreover, a lattice structure offers good breathability.

The properties of the lattice can be engineered to be anisotropic, for example the lattice may stretch easily in one direction and less easily in another direction. Additionally or alternatively, the lattice may be engineered to be dense in a first part of the second component and less dense in a second part of the second component, hence forming a firm first part and a softer, more cushioning second part.

In the second component, at least one first form-fitting element can be provided. Additive manufacturing techniques allow for a plurality of possibilities of providing a first form-fitting element in the second component. Thus, it is of particular advantage if the second component comprises a first form-fitting element. The second component may comprise a second form-fitting element or any desired number of form-fitting elements.

The first form-fitting element may be provided on the topside of the sole. If the second component is a topside of a sole of a shoe, it is advantageous that the first form-fitting element is provided on the topside of the sole in order to allow for a directly or indirectly form-fitted bond with a shoe upper.

For practical purposes, form-fitting elements for forming the form-fitted bond between the upper and the sole are for example provided on the topside of the sole in a knob-like shape. For example, when enclosed by the hot melt layer, they can result in the form-fitted bonds. The specific geometric shape of the individual form-fitting elements can vary in a wide range in this respect.

The first form-fitting element can be provided on a midsole of a multi-layered sole such that it faces the shoe upper. It can be of advantage to provide ideal cushioning properties via a midsole. In this case, the midsole is advantageously bonded to the shoe upper in a directly or indirectly form-fitted manner.

In an advantageous manner, at least one midsole in a multi-layered sole arrangement can be produced at least partly by means of an additive manufacturing method. By means of additive manufacturing, parts of the sole itself as well as its form-fitting elements can be produced integrally from one material in one operation. Hence, the individual operations and the materials used are kept to a minimum. At the same time, the advantages of additive shoe manufacturing (such as customization of the shoe's form and size in the sole region to the user's needs) can be maintained. In this regard, it is not necessary to produce an entire setup of a multi-layered sole additively. Rather, it is sufficient—if required—to additively produce in particular an upper region (i.e. the region of the sole where the form-fitting elements are provided facing the hot melt layer). The further regions of the sole can also be produced by means of conventional manufacturing techniques. In particular if the sole has a multi-layered structure, it can be advantageous to merely additively produce the midsole facing the mentioned exemplary hot melt layer, i.e. a bonding agent, while the outsole is for example manufactured conventionally. Conventional manufacturing can for example be carried out using an injection molding method and thus be fast and cost-effective. Hence, the advantages of both methods can be combined.

The midsole can further comprise a second form-fitting element which faces an outsole of the multi-layered sole and which is bonded to the outsole via a second bonding agent or in direct engagement in a form-fitted manner. Hence, it is possible to also provide a directly or indirectly form-fitted bond between the outsole and the midsole to improve the resilience of the bond between the outsole and the midsole particularly against lateral forces, such as shear forces.

If the midsole is profiled for form fitting on its two surfaces, the midsole can be bonded to both the shoe upper and the outsole via both-sided bonding agents, such as hot melt layers. However, for the bond with a thermoplastic outsole, the lower form-fitting elements of the midsole can also directly (i.e. without an additional hot melt layer) engage downwards in the outsole. Besides the form-fitted bond between the bonding agent, e.g. hot melt layer, and the topside of the sole described above, there can also be an additional form-fitted bond between the bonding agent, e.g. hot melt layer, and the bottom side of the upper. In this manner, the bonding strength between the upper and the sole can be further increased. This additional form-fitted bond can be based on form-fitting elements provided on the bottom side of the upper. The geometrical form of these form-fitting elements may, in turn, correspond to the forms mentioned above with respect to the form-fitting elements on the topside of the sole. However, as shoe uppers typically consist of textile fabric, it is also possible to dispense with the formation of concrete form-fitting elements on the bottom side of the upper and to provide a form-fitted bond between the textile fabric and the bonding agent, e.g. the hot melt layer.

The first and/or the second form-fitting element can be provided as a punctiform indentation and/or as a punctiform protrusion.

The first and/or the second form-fitting element can be provided as a channel-shaped indentation and/or as a surfacing bar. A channel-shaped indentation can be provided such that a channel extends along a surface of the second component, for example as a groove in a surface of the second component. A channel-shaped indentation can, however, also be provided such that a longitudinal direction of the channel extends into a surface of the second component. A surfacing bar can be provided such that a longitudinal direction of the surfacing bar extends along a surface of the second component.

For example, punctiform indentations or protrusions (i.e. "one-dimensional form-fitting elements") as well as elongated elements (e.g. channels and/or bars) or complex elements provided on the bonding level between sole and hot melt layer (i.e. "two-dimensional form-fitting elements") are possible; preferably, these form-fitting elements lead to the form fitting owing to undercuts in a direction parallel to the bonding level between the upper and the sole.

The composite sports article may further comprise a first channel with a first opening, of first width, arranged in a first surface of the second component, wherein the first channel is at least partially filled with the first bonding agent; wherein the first component is bonded to the second component at a bonding interface located adjacent to the first surface of the second component, and wherein the bonding interface comprises the first bonding agent.

The term "width" as used in the present application is to be understood in the broadest sense of the word "extent". In particular, the width can be measured at any angular orientation in a cross-sectional plane within the channel, wherein the cross-sectional plane is preferably perpendicular to a longitudinal direction of the channel. The cross-section of the channel may be circular, elliptical, rectangular, or may have any other geometry including an irregular geometry.

The first opening may have any regular, for example circular, elliptical, or rectangular, or irregular shape, on the first surface. In case of a non-circular shape, the first width is the greatest distance between two opposite sides of the first opening on the first surface of the second component. For example, for an elliptical opening, the first width is defined as the full length of the major axis of this elliptical opening. The first opening may be located adjacent to the bonding interface.

Due to the first channel that is at least partially filled with the bonding agent, the bond is strong especially against lateral forces, such as shear forces. Lateral forces are forces that are substantially at a 90 degree angle to a longitudinal direction of the first channel. Since the total area available for a chemical bond is increased due to the presence of the first channel, the bond is also improved against forces along a longitudinal direction of the first channel.

The bonding interface may be located in a rim portion of the midsole. It is advantageous for the bonding interface to be located in a rim portion of the midsole, as this allows for the upper to be bonded to the midsole all the way around the midsole, creating a strong bond, yet it may not be necessary to bond the upper to the midsole at the center of the midsole, i.e. outside of the rim portion. This reduces the amount of bonding agent required, therefore reducing the weight of the article of footwear. Moreover, the breathability of the shoe is improved by this arrangement.

The second component may comprise a second surface, wherein the second surface comprises a second opening, of a second width, to the first channel. The curing, or hardening, of the bonding agent is improved by a second opening of the first channel.

The second opening may have any regular, for example circular, or irregular shape, on the second surface. In case of a non-circular shape, the second width is the greatest distance between two opposite sides of the second opening on the second surface of the second component. For example, for an elliptical opening, the second width is defined as the full length of the major axis of this elliptical opening.

The bonding agent may spill out of the second opening of the first channel on the second surface of the second component thus forming a droplet of a third width, wherein the third width is greater than the second width. The droplet may have any regular, for example circular, or irregular shape. In case of a non-circular shape, the third width is the greatest distance between two opposite sides of the droplet on the second surface of the second component. The droplet may, for example, form a "mushroom head". Therefore, if there were a force directed from the second opening of the first channel to the first opening of the first channel, along a longitudinal direction of the first channel, the droplet would generate a mechanical resistance against this force. Hence, the droplet provides a mechanical adhesion between the first component and the second component. For an improved level of mechanical adhesion, it is preferable for the third width to be at least 20% larger than the second width, more preferably the third width is at least 40% larger than the second width.

The first channel may have a fourth width inside the second component; wherein the fourth width may be greater than the first width, and/or wherein the fourth width may be greater than the second width; or wherein the fourth width may be equal to the second width and to the first width. It is to be understood that the statements made herein concerning the geometric shape and determination of the first width apply analogously to the second, third, and fourth width. When a width is determined inside the channel, the width can be measured at any angular orientation in a cross-sectional plane within the channel, wherein the cross-sectional plane is preferably perpendicular to a longitudinal direction of the channel. The cross-section of the channel may be circular, elliptical, rectangular, or may have any other geometry including an irregular geometry.

In other words, the fourth width may be greater than the first width, or the fourth width may be greater than the second width, or the fourth width may be greater than the first and the second width. If the fourth width is greater than the first width, there will be a mechanical resistance preventing the bonding agent from sliding towards the first opening of the first width under the influence of force towards the first opening, thereby improving the strength of the bond between the first component and the second component. If the fourth width is greater than the second width, there will be a mechanical resistance preventing the bonding agent from sliding towards the second opening of the second width under the influence of force towards the second opening, thereby improving the strength of the bond between the first component and the second component. If the fourth width is greater than the first and second width, there will be a mechanical resistance preventing the bonding agent from sliding towards the first opening of the first width and the second opening of the second width under the influence of a force, thereby improving the strength of the bond between the first component and the second component.

Alternatively, the fourth width may be equal to the second width and the first width. This arrangement allows for the best flow of the liquid bonding agent into the first channel and possibly through the first channel. This arrangement may therefore be particularly suitable for a second component for which a long first channel is required.

At least one of the first, second, third, or fourth width may be between 0.3 mm and 3 mm. The inventors have found that if the first, second, or, if applicable, fourth width is too small, it is difficult to incorporate the bonding agent into the first channel and that if the first, second, or, if applicable, fourth width is too large, the bond is not strong enough. The inventors have found that a preferred range of the first, second, or, if applicable, fourth width is therefore between 0.3 mm and 3 mm, more preferably, between 0.5 mm and 2 mm. The third width is determined by the second width and the amount of bonding agent pushed through the first channel.

A longitudinal axis of the first channel may be at an angle of between 80 and 110 degrees to the first surface and/or the second surface of the second component. The inventors have found that in this arrangement, it is particularly easy to incorporate the bonding agent into the first channel.

In case that the first surface and/or the second surface is not flat, the angle between the longitudinal axis of the first channel is the angle between a tangential direction to the surface immediately adjacent to the first opening (in case of the first surface) or the second opening (in case of the second surface).

A longitudinal axis of the first channel may be at an angle of between 35 and 55 degrees to the first surface and/or the second surface of the second component. By arranging the first channel in this orientation, the strength of the bond can be improved for at least two reasons.

Firstly, the length of the first channel and therefore the area available for bonding can be increased, even when the maximum depth of the channel is limited, for example by the thickness of the second component. Here, the depth of the channel is defined as the separation measured at a right angle to the first surface between the deepest point of the channel, which may be at the second opening, and the first opening.

Secondly, for a force at a right angle to the first surface, the component of the force along a longitudinal direction of the first channel, i.e. parallel to the wall of the first channel, that is, the component that needs to overcome the sliding friction of the bonding agent in the first channel, is reduced by an angular decomposition of the force. For example, if there is a force F at right angles to the first surface pulling the bonding agent towards the first opening and if a longitudinal axis of the first channel is at an angle of 45° to the first surface, the force along the longitudinal axis only amounts to approximately 71% of F. Thus, it is harder to pull the first component at right angles to the second component off of the second component; therefore, the bond between the first component and the second component is stronger.

The first and/or second bonding agent may be a hot melt. Handling of a hot melt releases significantly less volatile organic compounds, such as solvents, than handling of other bonding agents. Moreover, activation of the hot melt, by melting, can be easily timed and controlled, thus simplifying and improving the production process.

The holt melt can form a hot melt layer. The hot melt layer may largely cover a bonding interface, or bonding area, between the first component and the second component. However, it is also possible that the hot melt is only applied point-wise in order to reduce the weight of the composite sports article.

The first component may further comprise a protective layer to prevent the first and/or the second bonding agent from entering the first component. In order to ensure the best possible bond for a given amount of first and/or second bonding agent, it is advantageous to prevent the bonding agent from entering the first component. Therefore, it may be preferable to use a protective layer, which may have, for example, a higher melting temperature than the hot melt, if hot melt is contained in the first and/or second bonding agent.

The protective layer may comprise polyurethane, for example thermoplastic polyurethane, to provide thermal formability. This way, a strong chemical bond may be formed between the protective layer and the bonding agent. For example, the bonding agent may also comprise thermoplastic polyurethane and the bonding agent may comprise a composition with a lower melting temperature than the melting temperature of the composition of the protective layer. The bond between the protective layer and the bonding agent will therefore be strong and bonding is easy to activate. Moreover, it is thus possible to reliably bond even a first component comprising very finely woven textiles to the second component.

The second component may further comprise a second channel. The total strength of the bond between the first component and the second component can be increased if there is not only a first channel, but also a second channel. There may be a plurality of channels. The second channel, or each channel of the plurality of channels may have the properties of the first channel as described herein.

The smallest distance between an outer edge of the first channel and an outer edge of the second channel may be between 0.3 and 3 mm. The inventors have found that if the smallest distance between an outer edge of the first channel and an outer edge of the second channel is too large, the total strength of the bond is too weak. On the other hand, if the smallest distance between the outer edge of the first channel and an outer edge of the second channel is too small, there is a risk of the second component tearing. Therefore, the smallest distance between an outer edge of the first channel and an outer edge of the second channel is preferably between 0.3 mm and 3 mm, more preferably between 0.5 mm and 2 mm.

The present invention also concerns a method of producing a composite sports article, comprising: (a) producing a first component; (b) producing a second component by means of an additive manufacturing technique, wherein at least one first form-fitting element is provided on the second component; and (c) bonding the first component to the second component by a first bonding agent.

The term "additive manufacturing techniques" is to be understood in the conventional manner. This means that additive manufacturing techniques refers to all techniques applying an additive shaping principle and thereby building physical 3D geometries by successive addition of material. Additive manufacturing techniques include 3D printing and techniques sometimes referred to as "rapid prototyping". In particular, additive manufacturing techniques comprise techniques such as laser sintering, direct metal laser sintering, selective laser melting, fused deposition modeling FDM®, fused filament manufacturing, and stereolithography. Any additive manufacturing technique is suitable for the present invention. The terms "manufacturing" and "producing" are to be considered as being synonymous.

Additive manufacturing techniques allow for a plurality of possibilities of providing a first form-fitting element in the second component. Thus, it is of particular advantage if the second component comprises a first form-fitting element. The second component may comprise a second form-fitting element or any desired number of form-fitting elements.

A bonding agent is any compound or composition that has any level of adhesion on the first component and/or the second component. It is to be noted that this level of adhesion may be very low. Especially on the second component, the chemical bond of the bonding agent may be very weak. In general, thermoplastic materials, such as hot melts, thermoplastic polyurethane, a polyamide (PA) or a polyether block amide (PEBA), are suitable as bonding agents.

According to the invention, there can be a form-fitted bond between the bonding agent and the second component, meaning that the bond between the first component and the second component is only form-fitted indirectly via the bonding agent. However, it is also possible that the bond between the first component and the second component is directly form-fitted, with the bond still using a first bonding agent, for example to generate a basic adhesion to hold the first and the second component in the form-fitted bond.

The composite sports article in accordance with the invention comprises a strong bond between the first component and the second component, even if the bonding agent does not adhere strongly to the second component. The bond is especially strong against lateral forces, such as shear forces.

The composite sports article may be an article of footwear, an article of apparel, or a sports accessory. The sports accessory in this context is any item used or worn during an athletic activity. A shin guard, gloves, or a sports racket are examples of sports accessories. An article of footwear, an article of apparel, or a sports accessory is subject to high forces and torques during physical activity. Therefore, it is particularly important that the bond between the first component and the second component is strong.

The composite sports article may be a shoe, the first component may be a part of a shoe upper and the second component may be a part of a sole. The term "upper" in the context of the present invention refers to a "shoe upper" unless anything else follows from the context. A shoe in the present context is any type of shoe, for example a soccer boot, a hiking boot, a running shoe, or a sandal. The present invention is greatly beneficial for a shoe, which needs to be strong and durable as it is exposed to the whole weight of the athlete. For example, a weak bond between the shoe upper and the sole may increase the risk of the upper tearing off the sole during physical activity. The shoe also needs to provide the right level of support, for example around the ankle, yet it has to be flexible, for example in an instep region and provide the right level of cushioning, for example in a heel region. Thus, it is of advantage to form the shoe as a composite article. A sole at least partly formed by means of additive manufacturing techniques allows for the right level of cushioning for each part of the foot and may be individually customized for the athlete. For example, the heel region may be engineered to provide a high level of cushioning while the toe region may be engineered to be firmer than the heel region. The present invention therefore provides a composite shoe with a preferred level of fit and ideal functional properties that is at the same time durable due to the strong bond between the shoe upper and the sole.

The composite sports article may be a shoe and the first component may be a bottom side of the shoe upper and the second component may be a topside of the sole.

The shoe upper may be a textile shoe upper. For example, manufacturing the shoe upper may comprise weft-knitting and/or warp-knitting. Such a shoe upper is particularly flexible and comfortable to wear. However, the shoe upper may also be at least partially woven or comprise non-woven parts. Moreover, the shoe upper may comprise at least one reinforcement element.

When manufacturing the shoe, the upper and the sole can first be produced separately from one another. During the production of the sole, form-fitting elements are provided on its topside. While the upper is typically manufactured by means of methods known from the textile industry, at least one layer of the sole is preferably produced by means of an additive manufacturing method. Subsequently, the topside of the sole and the bottom side of the upper are bonded to each other by a hot melt layer such that it forms a form-fitted bond at least between the upper and the sole.

If, during bonding the topside of the sole to the bottom side of the upper a pressure is applied to the bonding area between the sole and the upper (particularly perpendicular to the bonding area), the flowing around the form-fitting elements by the hot melt is supported and the formation of the form-fitted bond is facilitated. In this manner, it can particularly also be facilitated for the hot melt layer to enter the textile fabric of the upper such that, hence, both a form-fitted bond between the hot melt layer and the sole as well as between the hot melt layer and the upper is generated.

Producing a second component by means of an additive manufacturing technique may comprise: providing a photopolymer and selectively activating the photopolymer in order to form the second component.

Here, a photopolymer is any substance that can be activated, i.e. cured, by light, wherein activation causes a liquid photopolymer to solidify. A UV-curable resin is an example of a photopolymer. UV is an abbreviation for ultraviolet. The second component can for example comprise a mixture of UV-curable resin and polyurethane. In the cured state, this mixture yields a stiff and durable second component.

For example, the second component can be constructed by stereolithography which allows for the second component to be built with a particularly high resolution at fast production speeds. Production of the second component may comprise projecting ultraviolet light through an oxygen-permeable window into a reservoir with a photopolymer. A sequence of UV images are projected onto the photopolymer thus selectively solidifying the photopolymer. The partially-constructed second component is lifted out of the photopolymer reservoir by a build platform. Oxygen may be supplied through the oxygen-permeable window, in order to prevent an undesired activation of the photopolymer in a region around the oxygen-permeable window, the so-called "dead zone". This allows for a sufficient supply of non-activated photopolymer and prevents the partially-constructed second component from sticking to the window.

In addition to the activation by light, the photopolymer is preferably hardened additionally, for example by heating the second component with hot air, conductive heating (heat pressing), infrared radiation, or by any other suitable method. This additional hardening may greatly increase the strength of the material, for example as measured by the Young's modulus of the material. This additional hardening may be performed before bonding the second component to the first component in order to prevent damage to the second component during the bonding operation. Hardening at ambient temperature is also possible in principle, however, this would occupy more time.

Producing the second component may comprise the formation of a lattice structure, comprising a plurality of voids, in the second component. The voids may be connected to one another to form one large void within a mesh-like structure, or the voids may not be connected to one another. A lattice structure is preferable for a plurality of applications as it allows for a strong, yet flexible and cushioning structure to be produced at low weight. Moreover, a lattice structure offers good breathability.

The properties of the lattice can be engineered to be anisotropic, for example the lattice may stretch easily in one direction and less easily in another direction. Additionally or alternatively, the lattice may be engineered to be dense in a first part of the second component and less dense in a second part of the second component, hence forming a firm first part and a softer, more cushioning second part.

The first form-fitting element can be provided on a midsole of a multi-layered sole such that it faces the shoe upper. It can be of advantage to provide ideal cushioning properties via a midsole. In this case, the midsole is advantageously bonded to the shoe upper in a directly or indirectly form-fitted manner.

The midsole can further comprise a second form-fitting element which faces an outsole of the multi-layered sole and which is bonded to the outsole via a second bonding agent or in direct engagement in a form-fitted manner. Hence, it is possible to also provide a directly or indirectly form-fitted bond between the outsole and the midsole to improve the resilience of the bond between the outsole and the midsole particularly against lateral forces, such as shear forces.

The first and/or the second form-fitting element can be provided as a punctiform indentation and/or as a punctiform protrusion.

The first and/or the second form-fitting element can be provided as a channel-shaped indentation and/or as a surfacing bar. A channel-shaped indentation can be provided such that a channel extends along a surface of the second component, for example as a groove in a surface of the second component. A channel-shaped indentation can, however, also be provided such that a longitudinal direction of the channel extends into a surface of the second component. A surfacing bar can be provided such that a longitudinal direction of the surfacing bar extends along a surface of the second component.

Forming the first and/or second form-fitting element may comprise: forming a first channel with a first opening, of a first width, in a first surface of the second component; and wherein the method of producing a composite sports article may further comprise: forming a bond between the first component and the second component at a bonding interface located adjacent to the first surface of the second component, comprising: applying the first bonding agent to the first surface and at least partially filling the first channel with the first bonding agent.

The term "width" as used in the present application is to be understood in the broadest sense of the word "extent". In particular, the width can be measured at any angular orientation in a cross-sectional plane within the channel, wherein the cross-sectional plane is preferably perpendicular to a longitudinal direction of the channel. The cross-section of the channel may be circular, elliptical, rectangular, or may have any other geometry including an irregular geometry.

The first opening may have any regular, for example circular, elliptical, or rectangular, or irregular shape, on the first surface. In case of a non-circular shape, the first width is the greatest distance between two opposite sides of the first opening on the first surface of the second component. For example, for an elliptical opening, the first width is defined as the full length of the major axis of this elliptical opening. The first opening may be located adjacent to the bonding interface.

Due to the first channel that is at least partially filled with the bonding agent, the bond is strong especially against lateral forces, such as shear forces. Lateral forces are forces that are substantially at a 90 degree angle to a longitudinal direction of the first channel. Since the total area available for a chemical bond is increased due to the presence of the first channel, the bond is also improved against forces along a longitudinal direction of the first channel.

The bonding interface may be located in a rim portion of the midsole. It is advantageous for the bonding interface to be located in a rim portion of the midsole, as this allows for the upper to be bonded to the midsole all the way around the midsole, creating a strong bond, yet it may not be necessary to bond the upper to the midsole at the center of the midsole, i.e. outside of the rim portion. This reduces the amount of bonding agent required, therefore reducing the weight of the article of footwear. Moreover, the breathability of the shoe is improved by this arrangement.

The second component may comprise a second surface and the method may further comprise forming a second opening, of a second width, to the first channel in the second surface. The curing, or hardening, of the bonding agent is improved by a second opening of the first channel.

The second opening may have any regular, for example circular, or irregular shape, on the second surface. In case of a non-circular shape, the second width is the greatest distance between two opposite sides of the second opening on the second surface of the second component. For example, for an elliptical opening, the second width is defined as the full length of the major axis of this elliptical opening.

The method may further comprise the bonding agent spilling out of the second opening of the first channel on the second surface of the second component, thus forming a droplet of a third width, wherein the third width is greater than the second width.

The droplet may have any regular, for example circular, or irregular shape. In case of a non-circular shape, the third width is the greatest distance between two opposite sides of the droplet on the second surface of the second component. The droplet may, for example, form a "mushroom head". Therefore, if there were a force directed from the second opening of the first channel to the first opening of the first channel, along a longitudinal direction of the first channel, the droplet would generate a mechanical resistance against this force. Hence, the droplet provides a mechanical adhesion between the first component and the second component. For an improved level of mechanical adhesion, it is preferable for the third width to be at least 20% larger than the second width, more preferably the third width is at least 40% larger than the second width.

The first channel may have a fourth width inside the second component; wherein the fourth width may be greater than the first width, and/or wherein the fourth width may be greater than the second width; or wherein the fourth width may be equal to the second width and to the first width. It is to be understood that the statements made herein concerning the geometric shape and determination of the first width apply analogously to the second, third, and fourth width. When a width is determined inside the channel, the width can be measured at any angular orientation in a cross-sectional plane within the channel, wherein the cross-sectional plane is preferably perpendicular to a longitudinal direction of the channel. The cross-section of the channel may be circular, elliptical, rectangular, or may have any other geometry including an irregular geometry.

In other words, the fourth width may be greater than the first width, or the fourth width may be greater than the second width, or the fourth width may be greater than the first and the second width. If the fourth width is greater than the first width, there will be a mechanical resistance preventing the bonding agent from sliding towards the first opening of the first width under the influence of force towards the first opening, thereby improving the strength of the bond between the first component and the second component. If the fourth width is greater than the second width, there will be a mechanical resistance preventing the bonding agent from sliding towards the second opening of the second width under the influence of force towards the second opening, thereby improving the strength of the bond between the first component and the second component. If the fourth width is greater than the first and second width, there will be a mechanical resistance preventing the bonding agent from sliding towards the first opening of the first width and the second opening of the second width under the influence of a force, thereby improving the strength of the bond between the first component and the second component.

Alternatively, the fourth width may be equal to the second width and the first width. This arrangement allows for the best flow of the liquid bonding agent into the first channel and possibly through the first channel. This arrangement may therefore be particularly suitable for a second component for which a long first channel is required.

At least one of the first, second, third, or fourth width may be between 0.3 mm and 3 mm. The inventors have found that if the first, second, or, if applicable, fourth width is too small, it is difficult to incorporate the bonding agent into the first channel and that if the first, second, or, if applicable, fourth width is too large, the bond is not strong enough. The inventors have found that a preferred range of the first, second, or, if applicable, fourth width is therefore between 0.3 mm and 3 mm, more preferably, between 0.5 mm and 2 mm. The third width is determined by the second width and the amount of bonding agent pushed through the first channel.

The first channel may be formed such that a longitudinal axis of the first channel is at an angle of between 80 and 110 degrees to the first surface and/or the second surface of the second component. The inventors have found that in this arrangement, it is particularly easy to incorporate the bonding agent into the first channel.

In case that the first surface and/or the second surface is not flat, the angle between the longitudinal axis of the first channel is the angle between a tangential direction to the surface immediately adjacent to the first opening (in case of the first surface) or the second opening (in case of the second surface).

The first channel may be formed such that a longitudinal axis of the first channel is at an angle of between 35 and 55 degrees to the first surface and/or the second surface of the second component. By arranging the first channel in this orientation, the strength of the bond can be improved for at least two reasons.

Firstly, the length of the first channel and therefore the area available for bonding can be increased, even when the maximum depth of the channel is limited, for example by the thickness of the second component. Here, the depth of the channel is defined as the separation measured at a right angle to the first surface between the deepest point of the channel, which may be in the second opening, and the first opening.

Secondly, for a force at a right angle to the first surface, the component of the force along a longitudinal direction of the first channel, i.e. parallel to the wall of the first channel, that is, the component that needs to overcome the sliding friction of the bonding agent in the first channel, is reduced by an angular decomposition of the force. For example, if there is a force F at right angles to the first surface pulling the bonding agent towards the first opening and if a longitudinal axis of the first channel is at an angle of 45° to the first surface, the force along the longitudinal axis only amounts to approximately 71% of F. Thus, it is harder to pull the first component at right angles to the second component off the second component; therefore, the bond between the first component and the second component is stronger.

The first and/or second bonding agent may be a hot melt. Handling of a hot melt releases significantly less volatile organic compounds, such as solvents, than handling of other bonding agents. Moreover, activation of the hot melt, by melting, can be easily timed and controlled, thus simplifying and improving the production process.

The method may further comprise the formation of a hot melt layer which comprises the hot melt. The hot melt layer may largely cover a bonding interface, or bonding area, between the first component and the second component. However, it is also possible that the hot melt is only applied point-wise in order to reduce the weight of the composite sports article.

The method may further comprise: forming a protective layer on the first component to prevent the bonding agent from entering the first component. In order to ensure the best possible bond for a given amount of bonding agent, it is advantageous to prevent the bonding agent from entering the first component. Therefore, it may be preferable to use a protective layer, which may have, for example, a higher melting temperature than the hot melt, if hot melt is used as bonding agent.

The protective layer may comprise polyurethane, for example thermoplastic polyurethane, to provide thermal formability. This way, a strong chemical bond may be formed between the protective layer and the bonding agent. For example, the bonding agent may also comprise thermoplastic polyurethane and the bonding agent may comprise a composition with a lower melting temperature than the melting temperature of the composition of the protective layer. The bond between the protective layer and the bonding agent will therefore be strong and bonding is easy to activate. Moreover, it is thus possible to reliably bond even a first component comprising very finely woven textiles to the second component.

Applying a bonding agent to the bonding interface may comprise applying a sheet of solid bonding agent to the bonding interface and applying heat and pressure to the bonding interface. For example, a suitably sized and shaped sheet of solid bonding agent may be cut by any suitable means, for example by a laser, and placed on either the first component or the second component. This allows for a particularly convenient handling. Then, at a suitable time, the bonding agent can be activated by applying heat and the formation of the bond can be facilitated by the application of pressure. In particular, application of pressure also helps to force the bonding agent into the first channel.

Applying a sheet of solid bonding agent to the bonding location may be performed when the shoe upper is in a flat condition. It is easier to place a sheet of solid bonding agent to the shoe upper when it is in a flat condition. This may, for example, be performed fully automatically by a patch placement machine.

The method may further comprise forming a second channel in the second component. The total strength of the bond between the first component and the second component can be increased if there is not only a first channel, but also a second channel. There may be a plurality of channels. The second channel, or each channel of the plurality of channels may have the properties of the first channel as described herein.

The smallest distance between an outer edge of the first channel and an outer edge of the second channel may be between 0.3 and 3 mm. The inventors have found that if the smallest distance between an outer edge of the first channel and an outer edge of the second channel is too large, the total strength of the bond is too weak. On the other hand, if the smallest distance between the outer edge of the first channel and an outer edge of the second channel is too small, there is a risk of the second component tearing. Therefore, the smallest distance between an outer edge of the first channel and an outer edge of the second channel is preferably between 0.3 mm and 3 mm, more preferably between 0.5 mm and 2 mm.

BRIEF DESCRIPTION OF THE FIGURES

Below, exemplary embodiments of the invention will be described with reference to the figures. The Figures show:

FIG. 11: a sole with form-fitting elements provided as punctiform protrusions in top view.

FIGS. 12-17: embodiments for form-fitting elements provided on the topside of the sole in section.

DETAILED DESCRIPTION OF THE PREFERRED EMBODIMENTS

Only some possible embodiments of the invention are described in detail below. It is to be understood that these exemplary embodiments can be modified in a number of ways and combined with each other whenever compatible and that certain features may be omitted in so far as they appear dispensable. While the invention is described primarily with reference to a shoe, it is to be understood that the teachings of the present invention apply to any sports article, such as footwear, apparel, or sports accessories.

Figure 1A:
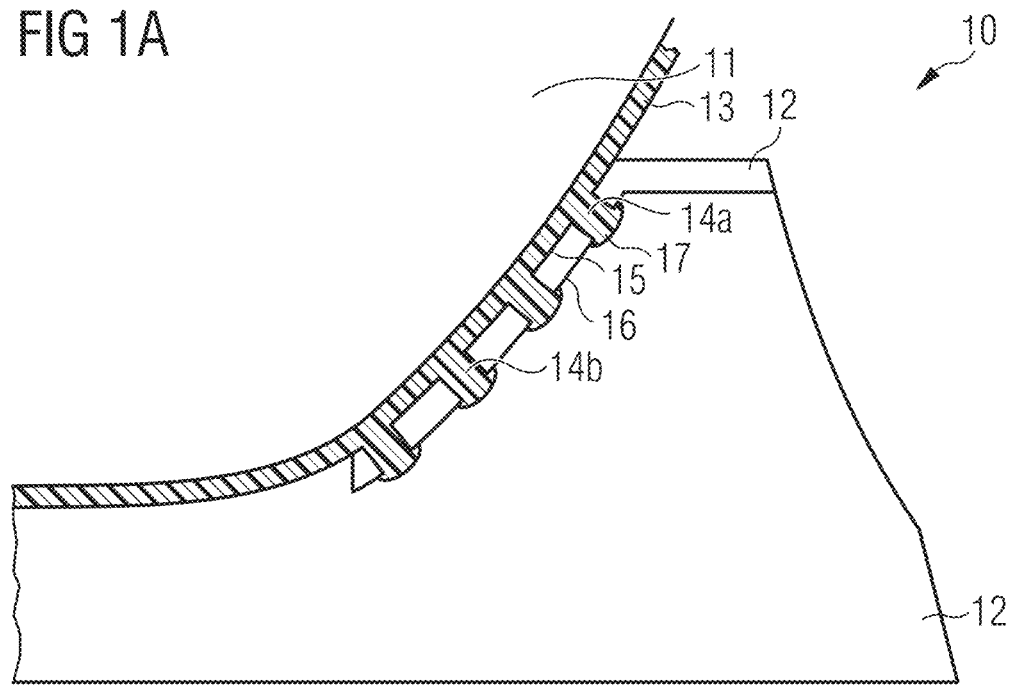
FIGS. 1A-1B: an exemplary sports article according to the present invention.
Figure 1B:
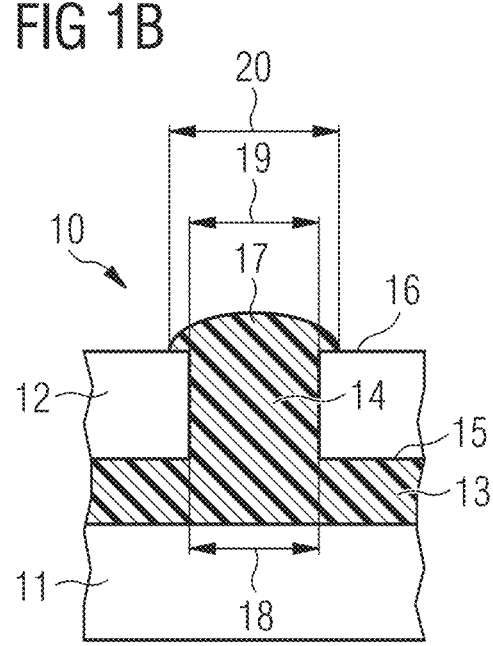

FIGS. 1A and 1B show a portion of an exemplary composite sports article (10) comprising: a first component (11); a second component (12), which was produced by means of an additive manufacturing technique; wherein the first component (11) and the second component (12) are bonded to each other by a first bonding agent and wherein there is a form-fitted bond between the first bonding agent (13) and the second component. In other words, the bond between the first component and the second component is only indirectly form-fitted via the bonding agent (13).

The composite sports article 10 in accordance with the invention comprises a strong bond between the first component 11 and the second component 12, even if the bonding agent 13 does not adhere strongly to the second component.

In the second component 12, a first 14a, second 14b, third and fourth form-fitting element are provided. The second component 12 may comprise any desired number of form-fitting elements.

In this example, the composite sports article 10 is a shoe, the first component 11 is a part of a shoe upper and the second component 12 is a part of a sole. In particular, the first component 11 is a bottom side of a shoe upper and the second component 12 is a topside of the sole.

The first form-fitting element 14a is provided on the topside of the sole 12. The first form-fitting element 14a is provided on a midsole of a multi-layered sole such that it faces the shoe upper.

The first 14a and/or the second 14b form-fitting element is provided as a channel-shaped indentation. A first channel 14b with a first opening, of a first width, is located in a first surface 15 of the second component, wherein the first channel 14a is at least partially filled with the first bonding agent 13. The first component 11 is bonded to the second component at a bonding interface, which is located adjacent to the first surface 15 of the second component 12 and the bonding interface comprises the first bonding agent 13.

Due to the first channel 14a that is at least partially filled with the bonding agent 13, the bond is particularly resilient against lateral forces, such as shear forces. Lateral forces are forces that are substantially at a 90 degree angle to a longitudinal direction of the first channel 14a. Since the total area available for a chemical bond is increased due to the presence of the first channel 14a, the bond is also improved against forces along a longitudinal direction of the first channel 14a.

In this example, the second component 12 moreover comprises a second channel 14b. The total strength of the bond between the first component 11 and the second component 12 can be increased if there is not only a first channel 14a, but also a second channel 14b. In this example, there is a plurality of channels. In this example, each channel of the plurality of channels has the properties of the first channel 14a. Hereinafter, reference number 14 will generally refer to one of the channels 14a, 14b.

In this example, the smallest distance between an outer edge of the first channel 14 and an outer edge of the second channel is between 0.3 and 3 mm. The inventors have found that if the smallest distance between an outer edge of the first channel 14 and an outer edge of the second channel is too large, the total strength of the bond is too weak. On the other hand, if the smallest distance between the outer edge of the first channel 14 and an outer edge of the second channel is too small, there is a risk of the second component 12 tearing itself. Therefore, the smallest distance between an outer edge of the first channel 14 and an outer edge of the second channel is preferably between 0.3 mm and 3 mm, more preferably between 0.5 mm and 2 mm.

In this example, producing the second component 12 comprises: providing a photopolymer and selectively activating the photopolymer in order to form the second component 12. Thus, the second component 12 comprises an activated photopolymer. Here, a photopolymer is any substance that can be activated, i.e. cured, by light, wherein activation causes a liquid photopolymer to solidify. A UV-curable resin is an example of a photopolymer. UV is an abbreviation for ultraviolet. In this example, the second component 12 comprises a mixture of UV-curable resin and polyurethane. After curing, this mixture yields a stiff and durable second component.

In this example, the second component 12 is constructed by stereolithography which allows for the second component 12 to be built with a particularly high resolution at fast production speeds. Production of the second component 12 comprises projecting of ultraviolet light through an oxygen-permeable window into a reservoir of photopolymer. A sequence of UV images are projected onto the photopolymer thus selectively solidifying the photopolymer. The partially-constructed second component is lifted out of the photopolymer reservoir by a build platform. Oxygen may be supplied through the oxygen-permeable window, in order to prevent an undesired activation of the photopolymer in a region around the oxygen-permeable window, the so-called "dead zone". This allows for a sufficient supply of non-activated photopolymer and prevents the partially-constructed second component from sticking to the window.

In this example, in addition to activation by light, the photopolymer is hardened additionally by heating the second component 12 with hot air, conductive heating (heat pressing), infrared radiation, or by any other suitable method. This additional hardening greatly increases the strength of the second component 12. In this example, the Young's modulus of the second component 12 increases due to the additional hardening by a factor of 10 or more. In this example, this additional hardening is performed before bonding the second component 12 to the first component 11 in order to prevent damage to the second component 12 during the bonding operation. Hardening at ambient temperature is also possible in principle, however, this would occupy more time.

In this example, the second component 12 comprises a second surface 16, wherein the second surface 16 comprises a second opening, of a second width 19, to the first channel 14. The curing, or hardening, of the bonding agent 13 is improved by a second opening to the first channel 14.

In this example, the bonding agent 13 spills out of the second opening of the first channel 14 on the second surface 16 of the second component 12 thus forming a droplet 17 of a third width 20, wherein the third width 20 is greater than the second width 19. The droplet 17 may have any regular, for example circular, or irregular shape. In case of non-circular shape, the third width 20 is the greatest distance between two opposite sides of the droplet 17 on the second surface 16 of the second component 12. In this example, the droplet 17 forms a "mushroom head".

If there is a force directed from the second opening of the first channel 14 to the first opening of the first channel 14, along a longitudinal direction of the first channel 14, the droplet 17 provides a mechanical resistance against this force. Hence, the droplet 17 provides a mechanical adhesion of the first component 11 and the second component 12. For an improved level of mechanical adhesion, it is preferable for the third width 20 to be at least 20% larger than the second width 19, more preferably the third width 20 is at least 40% larger than the second width 19.

In this example, the second width is equal to the first width. This arrangement allows for the best flow of liquid bonding agent into the first channel and through the first channel. This arrangement is therefore particularly suitable for a second component for which a long first channel is required.

In this example, at least one of the first, second, or third width is between 0.3 mm and 3 mm. The inventors have found that if the first, second, or, if applicable, fourth width is too small, it is difficult to incorporate the bonding agent 13 into the first channel 14 and if the first, second, or, if applicable, fourth width is too large, the bond is not strong enough. The inventors have found that a preferred range of the first or second width is therefore between 0.3 mm and 3 mm, more preferably, between 0.5 mm and 2 mm. The third width 20 is determined by the second width 19 and the amount of bonding agent 13 pushed through the first channel 14.

In this example, a longitudinal axis of the first channel 14 is at an angle of between 80 and 110 degrees to the first surface and/or to the second surface 16 of the second component 12. The inventors have found, that in this arrangement, it is particularly easy to incorporate the bonding agent 13 into the first channel 14.

In this example, the bonding agent 13 is a hot melt. Handling of a hot melt releases significantly less volatile organic compounds, such as solvents, than handling of other bonding agents. Moreover, activation of the hot melt, by melting, can be easily timed and controlled, thus simplifying and improving the production process.

Figure 2:
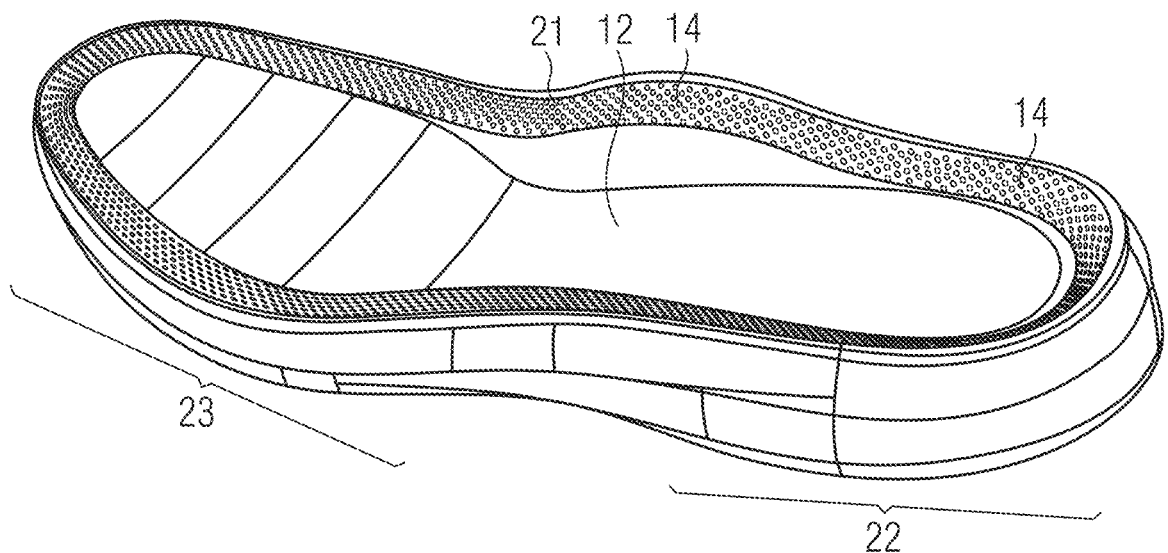
FIG. 2: an exemplary midsole for an article of footwear according to the present invention.

FIG. 2 shows an exemplary second component 12 for a sports article according to the invention. The second component 12 comprises a plurality of channels 14. In this example, the second component 12 is a midsole 12 for a shoe. The present invention is greatly beneficial for a shoe, which needs to be strong and durable as it is exposed to the whole weight of the athlete. A shoe is subject to high forces and torques during physical activity. A weak bond between the upper and the midsole may increase the risk of the upper tearing off the midsole during physical activity. The shoe also needs to provide the right level of support, for example around the ankle, yet it has to be flexible, for example in the instep region and provide the right level of cushioning, for example in the heel region. Therefore, the shoe is advantageously formed as a composite article. A midsole 12 formed at least partly by means of an additive manufacturing technique allows for the right level of cushioning for each part of the foot and may be customized individually for an athlete. For example, the heel region 22 may be engineered to provide a high level of cushioning while the toe region 23 may be engineered to be firmer than the heel region. The present invention therefore provides a composite shoe with a preferred level of fit and ideal functional properties that is at the same time durable due to the strong bond between the shoe upper and the midsole 12.

In this example, the second component 12 is the entire midsole. This way, the number of components is kept as low as possible, therefore improving the durability and comfort of the shoe as well as simplifying its construction.

In this example, the bonding interface is located in a rim portion 21 of the midsole 12. It is advantageous for the bonding interface to be located in a rim portion 21 of the midsole, as this allows for the upper to be bonded to the midsole 12 all the way around the midsole 12, creating a strong bond, yet it is not necessary to bond the upper to the midsole at the center of the midsole, i.e. outside of the rim portion 21. This reduces the amount of bonding agent 13 required, therefore reducing the weight of the shoe.

Figure 3:
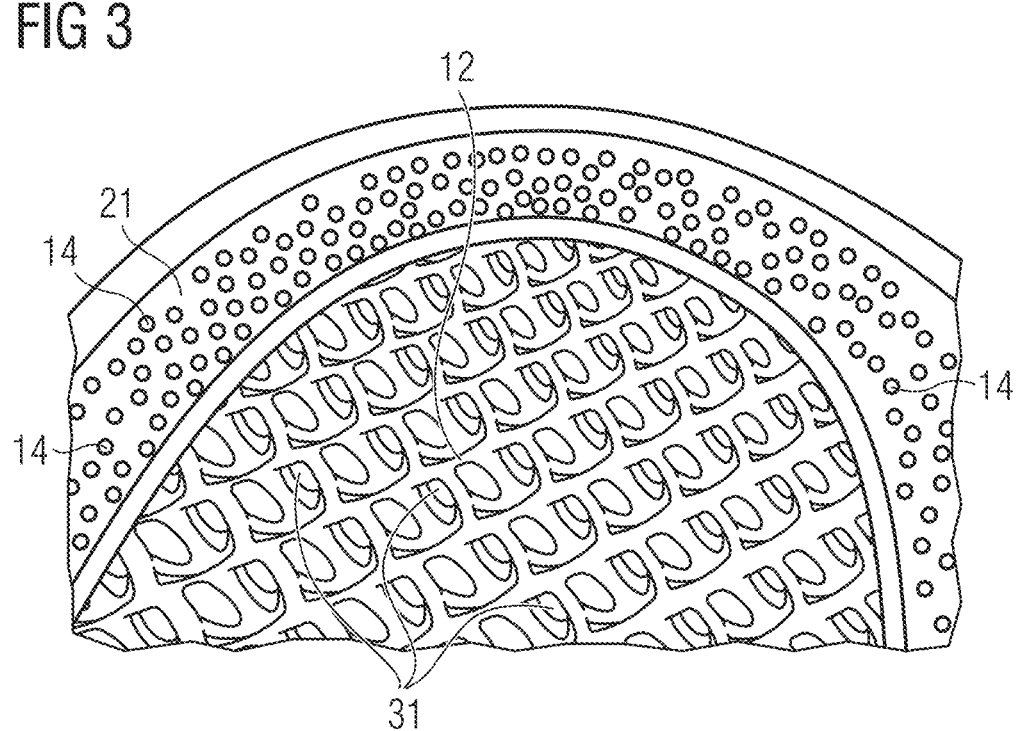
FIG. 3: another exemplary midsole for an article of footwear according to the present invention.

FIG. 3 shows an exemplary second component 12 according to the invention. The second component 12 comprises a plurality of channels 14. The second component 12 is a midsole 12 for a shoe. The bonding interface is located in a rim portion 21 of the midsole 12.

In this example, the midsole 12 comprises a lattice structure comprising a plurality of voids 31. The voids 31 are connected to one another to form one large void within a mesh-like structure. However, the voids 31 may also not be connected to one another. A lattice structure is preferable for a plurality of applications as it allows for a strong, yet flexible and cushioning structure to be produced at low weight. Moreover, a lattice structure offers good breathability.

The properties of the lattice can be engineered to be anisotropic, for example the lattice may stretch easily in one direction and less easily in another direction. Additionally, the lattice may be engineered to be denser in a first part, for example the toe region 23 of FIG. 2, of the midsole 12 and in a second part, for example the heel region 22 of FIG. 2, of the midsole 12, therefore providing a firm first part and a softer, more cushioning second part.

Figure 4A:
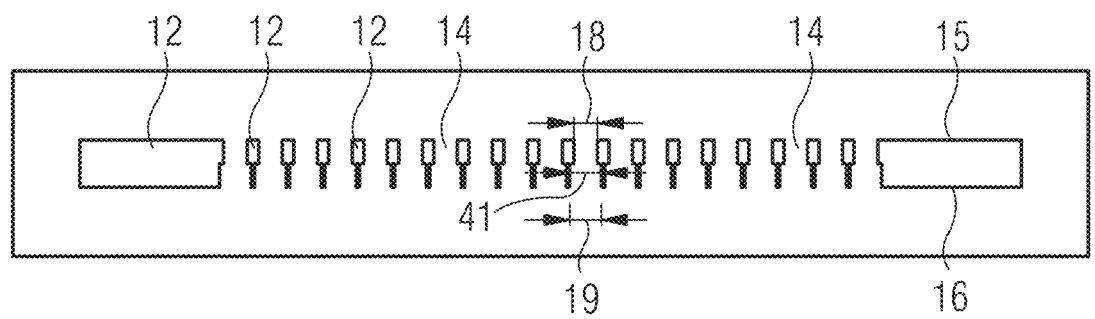
FIGS. 4A-4C: exemplary cross-sectional views of a second component according to the present invention.
Figure 4B:
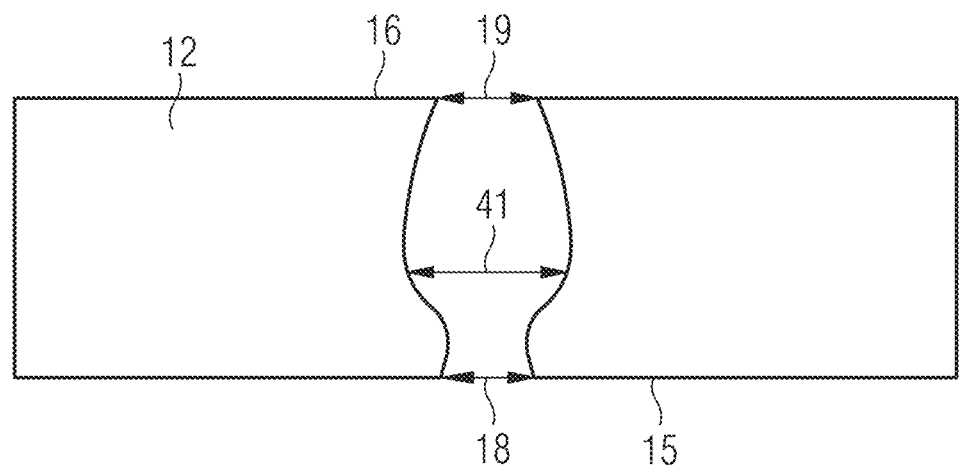
Figure 4C:
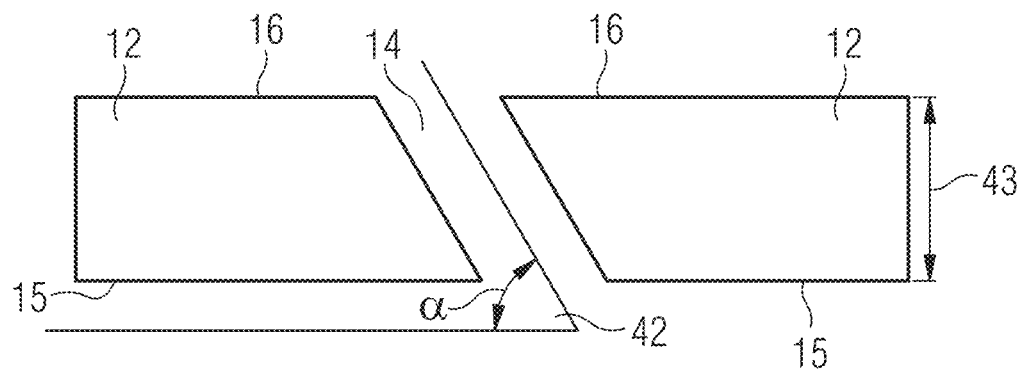

FIGS. 4A-C show exemplary cross sections of various second components 12 for a sports article according to the present invention.

FIG. 4A shows an exemplary second component 12. The second component 12 is produced by means of an additive manufacturing technique and comprises a plurality of channels 14 with a first opening, of a first width 18, in a first surface 15 of the second component 12. It is to be noted that while the cross-section shown in FIG. 4A shows apparently separate pieces of the second component 12, this is due to the cut shown in FIG. 4A and the apparently separate pieces are connected to one another at a different level of depth in the second component 12 (not shown).

The second component 12 comprises a second surface 16, wherein the second surface 16 comprises a second opening, of a second width 19, to the first channel. The curing, or hardening, of the bonding agent is improved by a second opening to the channels 14.

The first channel 14 has a fourth width 41 inside the second component 12, wherein the fourth width 41 is greater than the first width 18 and wherein the fourth width is equal to the second width 19. As the fourth width 41 is greater than the first width 18, there will be a mechanical resistance preventing the bonding agent 13 from sliding towards the first opening of the first width 18 under the influence of a force.

FIG. 4B shows an exemplary second component 12 for a sports article according to the present invention. In this example, the fourth width 41 is greater than the first width 18 and the second width 19. As the fourth width 41 is greater than the first width 18 and the second width 19, there will be a mechanical resistance preventing the bonding agent 13 from sliding towards the first opening of the first width 18 and the second opening of the second width 19 under the influence of a force towards the first opening or the second opening under the influence of a force, thereby improving the strength of the bond between the first component and the second component 12.

FIG. 4C shows an exemplary second component 12 for a sports article according to the present invention. In this example, a longitudinal axis of the first channel 14 is at an angle α 42 of between 35 and 55 degrees to the first surface 15 and to the second surface 16 of the second component 12. By arranging the first channel 14 in this orientation, the strength of the bond can be improved for at least two reasons.

Firstly, the length of the first channel 14 and therefore the area available for bonding can be increased, even when the maximum depth 43 of the channel is limited, for example by the thickness 43 of the second component 12. Here the depth of the channel is defined as the separation measured at a right angle to the first surface between the deepest point of the channel, which may be in the second opening, and the first opening.

Secondly, for a force at a right angle to the first surface, the component of the force along a longitudinal direction of the first channel 14, i.e. parallel to the wall of the first channel 14, that is, the component that needs to overcome the sliding friction of the bonding agent 13 in the first channel 14, is reduced by an angular decomposition of the force. For example, if there is a force F at right angles to the first surface pulling the bonding agent towards the first opening and if a longitudinal axis of the first channel 14 is at an angle 42 of α=45 degrees to the first surface, the force along the longitudinal axis only amounts to approximately 71% of F. Thus, it is harder to pull the first component 11 at right angles to the second component 12 off the second component 12; therefore, the bond between the first component 11 and the second component 12 is stronger.

In case that the first surface 15 and/or the second surface 16 is not flat, the angle between the longitudinal axis of the first channel 14 is the angle between a tangential direction to the surface immediately adjacent to the first opening (in case of the first surface 15) or the second opening (in case of the second surface 16).

Figure 5:
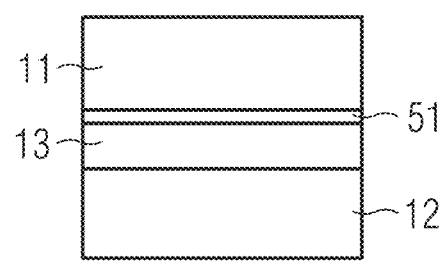
FIG. 5: an exemplary schematic of an arrangement of a first component, a protective layer, a bonding agent, and a second component according to the present invention.

FIG. 5 shows an exemplary schematic of the arrangement of the first component 11, a second component 12, a bonding agent 13, and a protective layer 51 for a sports article according to the present invention.

In this example, the first component 11 further comprises a protective layer 51 to prevent the bonding agent 13 from entering the first component 11. In order to ensure the best possible bond for a given amount of bonding agent 13, it is advantageous to prevent the bonding agent 13 from entering the first component 11. A protective layer 51 is used for this purpose, which has a higher melting temperature than the hot melt, used as the bonding agent 13.

In this example, the protective layer 51 comprises polyurethane. This way, a strong chemical bond may be formed between the protective layer 51 and the bonding agent 13. The bonding agent 13 in this example also comprises polyurethane. The bonding agent 13 also comprises a composition with a lower melting temperature than the melting temperature of the composition of the protective layer 51. The bond between the protective layer and the bonding agent 13 will therefore be strong and bonding is easy to activate. Moreover, it is thus possible to reliably bond even a first component 11 comprising very finely woven textiles to the second component 12.

Figure 6:
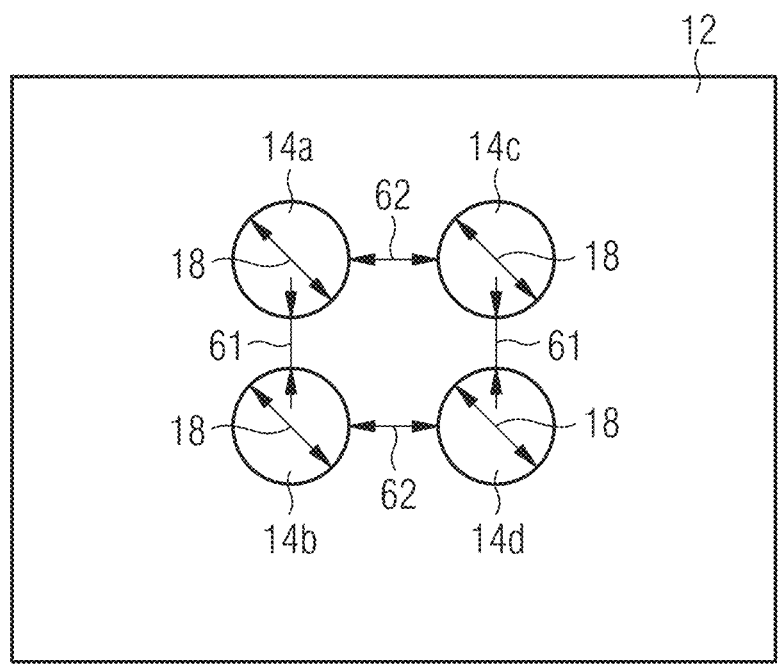
FIG. 6: an exemplary top view of a second component comprising a plurality of channels according to the present invention.

FIG. 6 shows a top view of a second component 12 for a sports article according to the present invention.

In this example, the second component 12 comprises a first channel 14a, a second channel 14b, a third channel 14c, and a fourth channel 14d. In this example, the smallest distance 61 between an outer edge of the first channel 14a and an outer edge of the second channel 14b is between 0.3 and 3 mm. The smallest distance 62 between an outer edge of the first channel 14a and an outer edge of the third channel 14c is between 0.3 and 3 mm. The inventors have found, that if the smallest distance between the adjacent channels is too large, the total strength of the bond is too weak. However, if the smallest distance between adjacent channels is too small, there is a risk of the second component 12 tearing itself. Therefore, the smallest distance between adjacent channels is preferably between 0.3 mm and 3 mm, more preferably between 0.5 mm and 2 mm.

In this example, the first openings of the channels 14 have a circular shape on the first surface.

Figure 7:
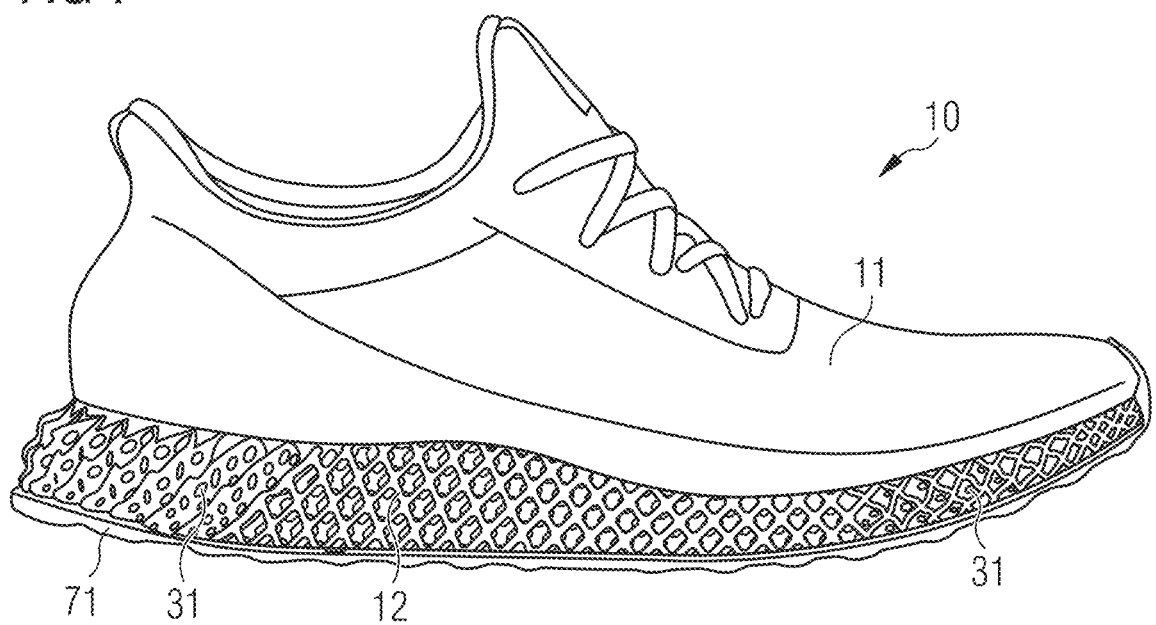
FIG. 7: an exemplary shoe comprising a midsole and an upper according to the present invention.

FIG. 7 shows an exemplary shoe 10 according to the present invention. The shoe comprises an upper 11 and a midsole 12, which was formed by means of an additive manufacturing technique and bonded to the upper 11 according to the present invention. The shoe 10 further comprises an outsole 71 that is adhesively attached to the midsole 12. However, the outsole 71 may also be attached to the midsole 12 by a method according to the claims of the present invention. In particular, the midsole 12 can comprise a second form-fitting element which faces an outsole 71 of the multi-layered sole and which is bonded to the outsole 71 via a second bonding agent or in direct engagement in a form-fitted manner. Hence, it is possible to also provide a directly or indirectly form-fitted bond between the outsole 71 and the midsole 12 to improve the resilience of the bond between the outsole 71 and the midsole 12 particularly against lateral forces, such as shear forces.

In this example, the midsole 12 comprises a lattice structure comprising a plurality of voids 31. The voids 31 may be connected to one another to form one large void 31 within a mesh-like structure, or the voids 31 may not be connected to one another. A lattice structure is preferable for a plurality of applications as it allows for a strong, yet flexible and cushioning structure to be produced at low weight. Moreover, a lattice structure offers good breathability.

In this example, the shoe upper 11 is a textile shoe upper. In particular, the shoe upper 11 is weft-knitted and/or warp-knitted. Thus, the shoe upper 11 is particularly flexible and comfortable to wear.

Figure 8A:
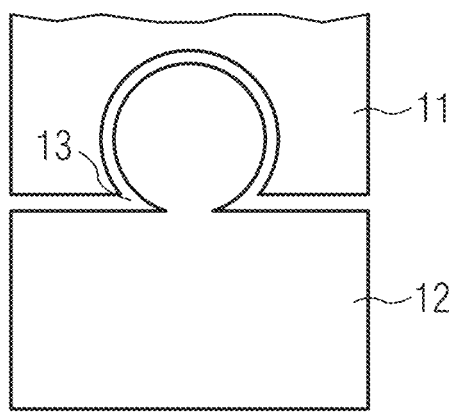
FIGS. 8A-8B: an exemplary sports article, wherein the bond between the first component and the second component is directly form-fitted.
Figure 8B:
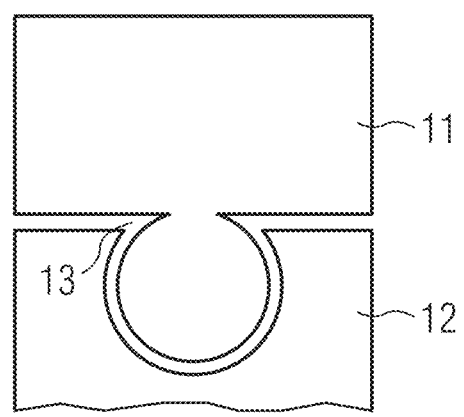

FIGS. 8A and 8B show an example of a first component 11 and a second component 12, wherein the bond between the first component 11 and the second component 12 is directly form-fitted. However, the bond still also uses a first bonding agent 13, for example to generate a basic adhesion to hold the first 11 and the second 12 component in the form-fitted bond.

In FIG. 8A, one first form-fitting element is provided in the second component 12. The first form-fitting element is provided as a surfacing bar. FIG. 8B shows an example in which the first form-fitting element is provided as a channel-shaped indentation. In this case, the channel-shaped indentation is provided such that a channel extends along a surface of the second component 12, for example as a groove in a surface of the second component 12.

FIGS. 9-17 show further embodiments of the present invention.

Example 1

Shoe (10), comprising a textile upper (11) and a sole (12), characterized in that a bottom side of the upper (11) and a topside of the sole (12) are bonded to each other in a form-fitted manner via a hot melt layer (13).

Example 2

Shoe according to example 1, characterized in that form-fitting elements (91) are provided at least on the topside of the sole (12).

Example 3

Shoe according to example 1 or 2, characterized in that the form-fitting elements (91) facing the shoe upper (11) are provided on a midsole (91) of a multi-layered sole (12).

Example 4

Shoe according to example 3, characterized in that the midsole (91) comprises form-fitting elements (91), which face an outsole (71) of the multi-layered sole (12) and are bonded to the outsole (71) via a hot melt layer (13) or in direct engagement in a form-fitted manner.

Example 5

Shoe according to example 2, characterized in that the form-fitting elements (91) are provided as punctiform indentations and/or as punctiform protrusions.

Example 6

Shoe according to example 2, characterized in that the form-fitting elements (91) are provided as channel-shaped indentations and/or as surfacing bars.

Example 7

Shoe according to one of the above examples 1-6, characterized in that the sole (12), in particular the upper region of the sole (12) or a midsole (91) is additively manufactured forming undercut form-fitting elements (91).

Example 8

Method for manufacturing a shoe (10), comprising the following method steps:
producing a textile upper (11) of the shoe (10);
producing a sole (12) of the shoe (10), wherein form-fitting elements (91) are provided on the topside of the sole (12);
bonding the topside of the sole (12) and the bottom side of the upper (11) to each other by a hot melt layer (13).

Example 9

Method according to example 8, characterized in that during the bonding of the topside of the sole (12) to the bottom side of the upper (11), preferably under application of heat, a pressure is applied to the bonding area between the sole (12) and the upper (11).

Example 10

Method according to one of the examples 8 or 9, characterized in that the production of the sole (12), in particular of an upper region of the sole (12) or a midsole (91), is carried out by means of an additive manufacturing method.

Example 11

Shoe (10), comprising an upper (11) and a sole (12), characterized in that a bottom side of the upper (11) and a topside of the sole (12) are bonded to each other by a hot melt layer (13), wherein there is a form-fitted bond between the hot melt layer (13) and at least the topside of the sole (12).

Example 12

Shoe according to example 11, characterized in that form-fitting elements (91) are provided at least on the topside of the sole (12).

Example 13

Shoe according to example 12, characterized in that the form-fitting elements (91) are provided as punctiform indentations and/or as punctiform protrusions.

Example 14

Shoe according to example 12, characterized in that the form-fitting elements (91) are provided as channel-shaped indentations and/or as surfacing bars.

Example 15

Shoe according to one of the above examples 11-14, characterized in that the sole (12), in particular an upper region of the sole (12) or a midsole (92) is additively manufactured forming undercut form-fitting elements (91).

Example 16

Shoe according to one of the above examples 11-15, characterized in that there is an additional form-fitted bond between the hot melt layer (13) and the bottom side of the upper (11).

Example 17

Method for manufacturing a shoe (10), comprising the following method steps:
producing an upper (11) of the shoe (10);
producing a sole (12) of the shoe (10), wherein form-fitting elements (91) are provided on the topside of the sole (12);
bonding the topside of the sole (12) and the bottom side of the upper (11) to each other by a hot melt layer (13) such that the hot melt layer (13) forms a form-fitted bond with the topside of the sole (12).

Example 18

Method according to example 17, characterized in that during the bonding of the topside of the sole (12) to the bottom side of the upper (11), preferably under application of heat, a pressure is applied to the bonding area between the sole (12) and the upper (11).

Example 19

Method according to one of the examples 17 or 18, characterized in that the production of the sole (12), in particular of an upper region of the sole (12) or a midsole (92), is carried out by means of an additive manufacturing method.

Example 20

Method according to one of the above examples 17 through 19, characterized in that in addition to the formation of the form-fitted bond between the topside of the sole (12) and the hot melt layer (13), a form-fitted bond is formed between the bottom side of the upper (11) and the hot melt layer (13).

Below, examples 1-20 will be described in further detail with reference to FIGS. 9-17.

Figure 9:
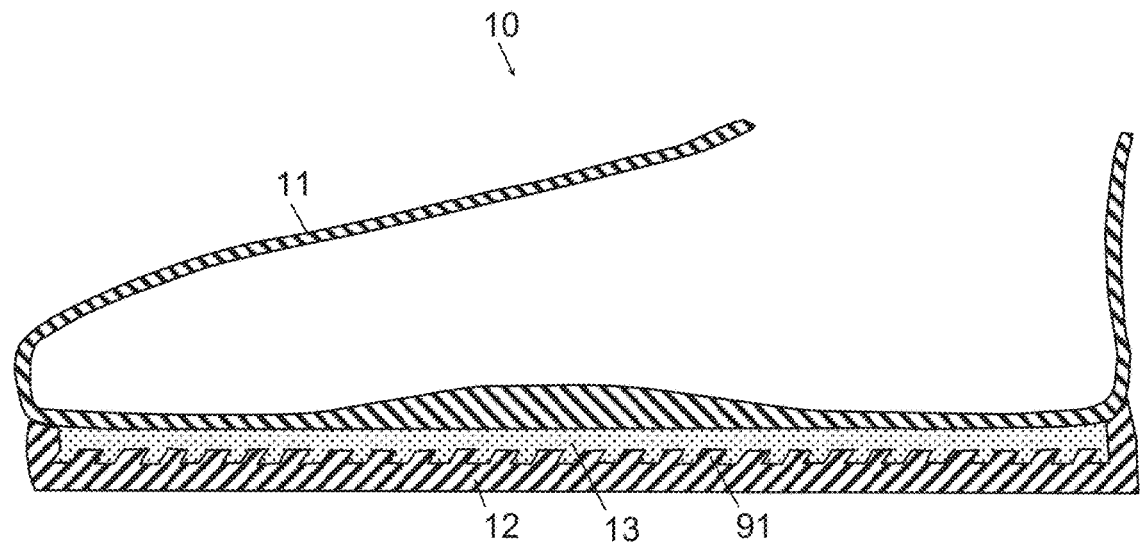
FIG. 9: a shoe with an upper, bonding agent and sole in cross section.

The shoe 10 outlined in FIG. 9 comprises an upper 11 and a sole 12. Between the upper 11 and the sole 12, there is a hot melt layer 13 (shown in the Figures by points) providing a form-fitted bond between the bottom side of the upper 11 and the topside of the sole 12. The sole 12, in turn, has two layers in this example according to the invention, wherein a midsole 92 contacts the hot melt layer 13 and an outsole 71 joins below the midsole 92.

The upper 11 of the shoe 10 is essentially manufactured from a textile fabric and serves the purpose of accommodating the foot of the user. The sole 12, which is for example formed from a polyurethane material, contacts the ground during walking/running with the bottom side of the outsole 71.

Form-fitting elements 91 are provided on the topside of the midsole 92—and thus also on the topside of the multi-layered sole 12—in the embodiment of the shoe 10 shown in FIG. 1. For reasons of clarity, merely one form-fitting element 91 has a reference number. The form-fitting elements 91 shown here protrude from the surface of the midsole 92 in a cam-like manner tilted towards the heel region of the shoe 10, where they are encompassed and covered by the hot melt layer 13. This tilt at an acute angle to the base of the topside of the sole 12 results in undercuts, which are filled by the hot melt layer 13 such that there is a manifold form-fitted bond between the hot melt layer 13 and the topside of the sole 12.

What is not shown in the drawings is the further embodiment according to which such geometrically modified undercut form-fitting elements 91 may also protrude from the opposite surface of the midsole 92. There, these can be enclosed by an additional hot melt layer 13 extending between the outsole 71 and the midsole 92, or they directly engage in the upper surface of the outsole 71 consisting of thermoplastic material.

For manufacturing the shoe 10, the upper 11 and the sole 12 are first produced separately and are only subsequently bonded to each other by the hot melt layer 13. Producing the upper 11 can for example be carried out by means of known methods of textile technology for manufacturing a textile fabric. For producing the sole 12, for practical purposes the midsole 92 is manufactured first, preferably by means of an additive manufacturing method (layer manufacturing methods as in 3D printing). During this additive manufacturing, the form-fitting elements 91 may be provided at least on the topside of the midsole 92. In a further manufacturing step, the midsole 92 may then be bonded to the outsole 71, for example directly by adhesive force or in a form-fitted manner and again directly or via a hot melt layer 13. For bonding the upper 11 to this sole 12, subsequently, a geometrically limited hot melt layer 13 is inserted between the upper 11 and the sole 12 and is melted under the application of pressure and temperature. The melted hot melt layer 13 flows around the form-fitting elements 91 on the sole 12 and enters the textile fabric of the upper 11 such that an elastic form-fitted bond between hot melt layer 13 and sole 12 as well as between hot melt layer 13 and upper 11 is given after cooling.

The form-fitting elements 91 outlined in section in FIG. 9 do not have to be tilted locally limited elevations from the surface of the midsole 92. These can also be cuts across the longitudinal extension of bar-shaped or strip-shaped form-fitting elements 91 with tilted flanks on and/or under the midsole 92, as outlined in FIG. 10 in top view. There, linear form-fitting elements 91 run parallel to each other and across the longitudinal extension of the shoe 10.

FIG. 11 shows an embodiment, wherein the form-fitting elements 91 are provided in a punctiform manner. In particular, the form-fitting elements 91 are provided as knobs (protrusions), which are distributed on the topside of the midsole 92. For reasons of clarity, only three of the form-fitting elements 91 are provided with reference numbers in FIG. 11 as well.

Figure 10:
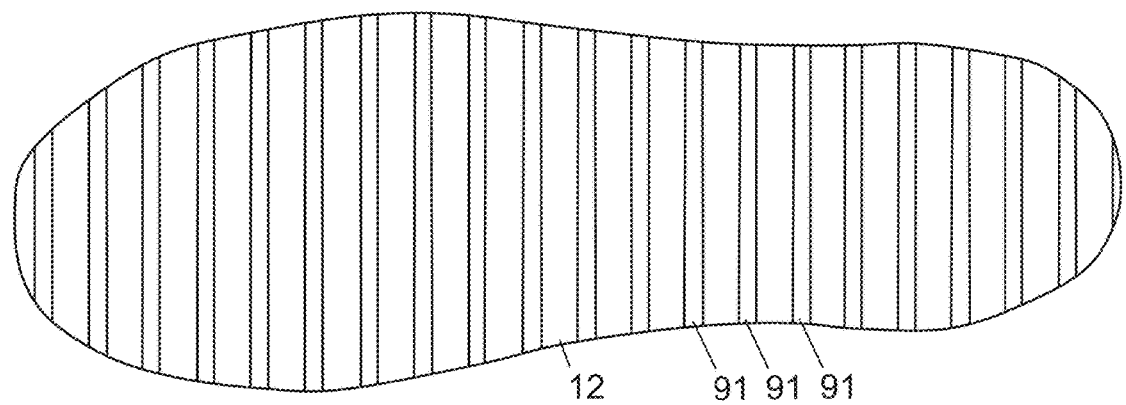
FIG. 10: a sole with form-fitting elements provided as elongated bars in top view.

FIGS. 12 through 17 show preferred cross sections of the form-fitting elements 91 in a sectional plane chosen analogously to that of FIG. 9. While in elongated form-fitting elements (as shown in FIG. 10), the cross sections are constant or constantly change along the longitudinal direction of the form-fitting elements, the punctiform form-fitting elements (as shown in FIG. 11) may be provided axisymmetrically, then, the cross sections are rotationally symmetrical.

The form-fitting elements 91 shown in FIGS. 12 through 14 are respectively provided as a protrusion/elevation on or as an indentation in the topside of the midsole 92 and encompassed by or at least partially filled by the hot melt layer 13. The form-fitting element 91 from FIG. 12 has a cross section in form of a parallelogram. The form-fitting element 91 from FIG. 13 has a cross section in form of a symmetrical trapezoid and the form-fitting element 91 from FIG. 14 is provided in a balloon-shaped or in a drop-shaped manner.

The form-fitting elements 91 shown in FIGS. 15 through 17 are respectively recessed into the topside of the midsole 92 as indentations and at least partially filled with hot melt from the layer 13. The form-fitting element 91 from FIG. 15 has a cross section in form of a symmetrical trapezoid. The form-fitting element 91 from FIG. 16 has a cross section in form of a parallelogram and the form-fitting element 91 from FIG. 17 is, in turn, provided in a balloon-shaped or in a drop-shaped manner. The form-fitting elements 91 shown in FIGS. 15 through 17 are respectively entirely filled with hot melt.

However, it is also possible that the form-fitting element 91 is not entirely filled with hot melt such that, rather, a void remains. In other words, it is, thus, not necessary that the form-fitting element 91 is entirely filled with hot melt. An at least partial entering of the form-fitting element 91 by the hot melt is sufficient, wherein the entering must at least be carried out to a certain degree, such that a form-fitted bond is formed between the form-fitting element 91 and the hot melt layer 13 which is mechanically sufficiently robust.

Thus, the cross-section forms are not relevant in detail. It merely has to be ensured that respectively at least one sufficient undercut oriented for example in parallel to the bonding level is provided at the form-fitting elements 91 such that there is a form-fitted bond between these and the hot melt layer 13.

Although the embodiments on the one hand show elongated form-fitting elements 91 reaching across the topside of the sole 12 and on the other hand show punctiform form-fitting elements 91, mixed forms, such as oval form-fitting elements, i.e. form-fitting elements comprising an oval-shaped contour in a top view of the sole 12 (analogously to the view chosen in FIG. 11), can also be realized.

Although the sole 12 has a two-layered setup of midsole 92 and outsole 71 in the shown embodiments, another setup of the sole 12 is also conceivable. For example, the sole 12 may consist of one layer, i.e. of a homogeneous material layer, or of more than two layers. Irrespective of the specific setup of the sole 12, form-fitting elements 91 are in any case provided on the topside of the sole 12 facing the upper 11 of the shoe 10.

Thus, the shoe 10 has an upper 11 and a sole 12, with the bottom side of the upper 11 and the topside of the sole 12 being bonded to each other in a form-fitted manner by a layer 13 of hot melt. In any case, form-fitting elements 91 are provided on the topside of the sole 12, which effect a form-fitted bond between the hot melt layer 13 and the topside of the sole 12/its midsole 92. The latter can, moreover, be bonded to a subjacent outsole 71 via a further hot melt layer between the outsole 71 and the profiled midsole 92 or by direct engagement of the midsole 92 in the thermoplastic outsole 71. Above these levels, the hot melt may have entered the fabric of the shoe upper 11. The form-fitting elements 91 may be provided both as punctiform protrusions or indentations as well as elongated channels or bars at the respective surface. Preferably, a multi-layered sole 12 is manufactured at least partly by means of an additive manufacturing method and the form-fitting elements 91 are provided as integral parts on the topside of the sole 12 right in the course of this.

REFERENCE NUMBERS

10: composite sports article,
11: first component,
12: second component,
13: bonding agent,
14, 14a, 14b: channel,
15: first surface,
16: second surface,
17: droplet,
18: first width,
19: second width,
20: third width,
21: rim portion,
22: heel region,
23: toe region,
31: void,
41: fourth width,
42: angle,
43: thickness,
51: protective layer,
61, 62: smallest distance between an outer edge of a first channel and an outer edge of an adjacent second channel,
71: outsole,
91: form-fitting element,
92: midsole.

What is claimed is:

1. A composite sports article, comprising:
a first component comprising a shoe upper;
a second component comprising a sole, which was manufactured by means of an additive manufacturing technique, wherein the second component comprises an upper surface, an opposing lower surface, and at least one form-fitting element extending from the upper surface to the lower surface; and
a heat-activated bonding agent that bonds the first component to the second component, wherein the heat-activated bonding agent is arranged on the upper surface of the second component at an interface between a lower surface of the first component and the upper surface of the second component, and wherein the heat-activated bonding agent extends through the at least one form-fitting element onto the lower surface of the second component.

2. The composite sports article according to claim 1, wherein the composite sports article is a shoe; and wherein the first component is a bottom side of the shoe upper and the second component is a topside of the sole.

3. The composite sports article according to claim 1, wherein the second component comprises a lattice structure comprising a plurality of voids.

4. The composite sports article according to claim 1, wherein the at least one form-fitting element is provided in a midsole of the sole.

5. The composite sports article according to claim 1, wherein the at least one form fitting element comprises a first channel with a first opening, of a first width, which is located in the upper surface of the second component.

6. The composite sports article according to claim 5,
wherein the second component comprises a second surface,
wherein the second surface comprises a second opening, of a second width, of the first channel.

7. The composite sports article according to claim 6,
wherein the first channel has a fourth width inside the second component; and
wherein the fourth width is greater than the first width, and/or
wherein the fourth width is greater than the second width; or
wherein the fourth width is equal to the second width and the first width.

8. The composite sports article according to claim 1, wherein the heat-activated bonding agent comprises a layer of a hot melt.

9. The composite sports article according to claim 1, wherein the first component further comprises a protective layer to prevent the heat-activated bonding agent from entering the first component.

10. The composite sports article of claim 1, wherein the heat-activated bonding agent bonds the upper surface of the second component to a lower surface of the first component.

11. A composite sports article, comprising:
a shoe upper;
a midsole comprising a lattice structure defining a plurality of voids, wherein the midsole is manufactured by an additive manufacturing technique, and wherein the midsole comprises a center portion surrounded by a rim portion,
a plurality of channel-shaped indentations formed in the rim portion of the midsole, wherein no channel-shaped indentations are arranged in the center portion; and
a bonding agent that bonds the shoe upper to the midsole, wherein the bonding agent is arranged at an interface between a lower surface of the shoe upper and an upper surface of the rim portion of the midsole, wherein each of the plurality of channel-shaped indentations is at least partially filled with the bonding agent.

12. The composite sports article of claim 1, wherein the bonding agent comprises a thermoplastic material selected from thermoplastic polyurethane, a polyamide, and a polyether block amide.

13. The composite sports article of claim 11, wherein the plurality of channel-shaped indentations are spaced from one another by a distance of 0.3 mm to 3 mm.

14. The composite sports article of claim 11, wherein the lattice structure comprises an activated photopolymer.

15. The composite sports article of claim 11, wherein the shoe upper comprises a knit material.

* * * * *